US008757192B2

(12) United States Patent
Priestly

(10) Patent No.: US 8,757,192 B2
(45) Date of Patent: Jun. 24, 2014

(54) IN VALVES

(76) Inventor: Toby Priestly, Hindhead (GB)

( * ) Notice: Subject to any disclaimer, the term of this patent is extended or adjusted under 35 U.S.C. 154(b) by 365 days.

(21) Appl. No.: 13/127,206

(22) PCT Filed: Oct. 28, 2009

(86) PCT No.: PCT/GB2009/002564
§ 371 (c)(1),
(2), (4) Date: May 2, 2011

(87) PCT Pub. No.: WO2010/061159
PCT Pub. Date: Jun. 3, 2010

(65) Prior Publication Data
US 2011/0209778 A1 Sep. 1, 2011

(30) Foreign Application Priority Data

Nov. 3, 2008 (GB) .................................. 0820039.6
Jun. 3, 2009 (GB) .................................. 0909523.3

(51) Int. Cl.
*F16K 17/36* (2006.01)
*B65D 90/22* (2006.01)
(52) U.S. Cl.
USPC ........................... 137/81.2; 137/205; 220/747
(58) Field of Classification Search
USPC ........ 137/81.2, 205, 197–198, 386, 404, 613,
137/597, 599.03, 601.18; 114/125;
220/203.28, 203.24, 203.23, 203.19,
220/203.01, 748, 747, 745
See application file for complete search history.

(56) References Cited

U.S. PATENT DOCUMENTS

| | | | | |
|---|---|---|---|---|
| 3,829,024 A * | 8/1974 | Heden | ........................... | 239/310 |
| 3,868,921 A | 3/1975 | Seymour et al. | | |
| 5,372,116 A * | 12/1994 | Davis | ........................... | 123/516 |
| 7,178,512 B1 * | 2/2007 | Merten | ........................ | 123/516 |
| 2006/0180214 A1 * | 8/2006 | Arentsen et al. | .............. | 137/613 |
| 2007/0209716 A1 * | 9/2007 | Rankin | ......................... | 137/554 |
| 2009/0266078 A1 * | 10/2009 | Murray | .......................... | 60/734 |
| 2009/0283153 A1 * | 11/2009 | Fong et al. | .................... | 137/177 |

FOREIGN PATENT DOCUMENTS

| | | | | |
|---|---|---|---|---|
| EP | 1855037 A1 | 11/2007 | | |
| GB | 2325440 A | 11/1998 | | |
| GB | 2448476 A | 10/2008 | | |
| GB | 2459683 A * | 11/2009 | ............. | F16K 31/00 |
| WO | WO 2004/014724 A1 | 2/2004 | | |

* cited by examiner

*Primary Examiner* — Craig Schneider
*Assistant Examiner* — David Colon Morales
(74) *Attorney, Agent, or Firm* — Gable Gotwals

(57) ABSTRACT

This invention relates to a valve comprising a housing having first and second apertures for the ingress and egress of fluid into/from a passageway located within the housing extending indirectly from the first to the second aperture. The passageway forms an air-lock. The valve further comprises at least one bleed valve for allowing fluid out of the passageway at a rate slower than fluid is able to enter one of the apertures. A liquid entering one of the apertures is prohibited from passing along the passageway to the other of the apertures until substantially all air within the valve has bled out of the bleed valve.

23 Claims, 7 Drawing Sheets

IN VALVES

CROSS-REFERENCE TO RELATED APPLICATIONS

This application is the United States National Phase of PCT Patent Application No. GB2009/002564 filed on 28 Oct. 2009, which was published on 3 Jun. 2010 under Publication No. WO 2010/061159 A1, which claims priority to Great Britain Patent Applications No. 0820039.6 filed 3 Nov. 2008 and No. 0909523.3 filed 3 Jun. 2009, each of which is incorporated herein by reference.

The invention relates to improvements in valves, and in particular to a valve which can be used to enable shipping containers to sink. The valve incorporates an air lock to prevent accidental activation.

There are up to eight million shipping containers at sea at any given moment. They are often stacked, one on top of another, up to six high on the decks of the vessels that carry them. A stack of six is generally the maximum due to the structural limitations of the bottom container (in holding up to five above it) and this can lead to weight distribution and stability issues on the vessel.

Container traffic is currently increasing by around 15% per annum. Depending on the source of the figures, at the moment between ten and twenty thousand containers fall off these vessels per annum. This is due to a number of factors, but high seas, waves and bad weather in general are the main causes. Of course foundering ships are also known to drop containers, the "MSC Napoli" lost just under a tenth of its 2400 containers off the Dorset coast in January 2007.

It seems to be agreed generally that around 50% of these lost containers sink immediately, mainly due to their weight, but sometimes due to structural defects or damage caused by the fall or collision with other containers enroute to the water.

Depending upon the source of the figures available (whether these are sourced from the "losers" of the containers or the "sufferers" of the subsequent losses to property caused by them being afloat on the open sea) the remainder sink at some point between a "period of days" and never. By definition, most of these floating containers are in the major shipping lanes for some time, presenting a significant hazard to sea borne vessels.

Some containers (particularly ones carrying buoyant materials) will never sink, at least until they are dashed on reefs or rocks and break up. Others can take many weeks, months or even years to sink. A great many of them end up neutrally buoyant, semi submerged, a couple of inches beneath the surface of the sea. For as long as they are there they are a serious danger to shipping, particularly leisure craft and small to medium sized vessels. Shipping containers have even been reported as causing damage to submarines; one submarine recently hit a container "hanging" stationary at a depth of 100 m head-on.

The way this problem is currently dealt with is avoidance. In others words, watches are posted to look out for containers. There are sonar and even infra red systems available to detect objects floating just beneath the surface, but again these are systems designed to spot and alert of the danger not to minimise its presence.

In the past, air forces and navies have used containers (particularly ones located in major shipping lanes) as target practice, in order to sink them. However this practise is no longer widespread due to environmental concerns.

The present invention therefore aims to resolve this problem by providing a valve which is effectively water operated to allow water to flow into a container, preferably after a small delay once it comes into contact with the sea, to enable it to sink.

The invention therefore provides a valve comprising a housing having first and second apertures for the ingress and egress of fluid into/from a passageway located within the housing, said passageway extending indirectly from the first to the second aperture, and providing an air-lock, the valve further comprising at least one means for allowing fluid to bleed out of the passageway at a rate slower than fluid is able to enter one of the apertures, wherein a liquid entering one of the apertures is prohibited from passing along the passageway to the other of the apertures until substantially all air within the valve has bled out of the bleed means.

The invention also provides a valve comprising a valve comprising a housing having first and second apertures for the ingress and egress of fluid into/from a passageway located within the housing, said passageway extending indirectly from the first to the second aperture and comprising means to create an air-lock, the valve further comprising at least one means for allowing fluid to bleed out of the passageway at a rate slower than fluid is able to enter one of the apertures, wherein a liquid entering one of the apertures is prohibited from passing along the passageway to the other of the apertures until substantially all air within the valve has bled out of the bleed means.

The incorporation of an air-lock and a bleed valve in the valve allows air (or water) to escape from the valve in a controlled way and allow air or water to flow through the valve into or out of the container depending on the conditions. Certain designs of the valve also mean that the valve can still operate if the device becomes inverted. If the device is oriented on its side, the valve does not operate as a valve and simply becomes a tube.

One advantage of this type of valve is that it operates automatically, for example at sea, with no power source, and has no moving parts which can malfunction or require servicing.

The invention will now be described, by way of example only, with reference to and as shown in the accompanying drawings in which:—

Figure 2:
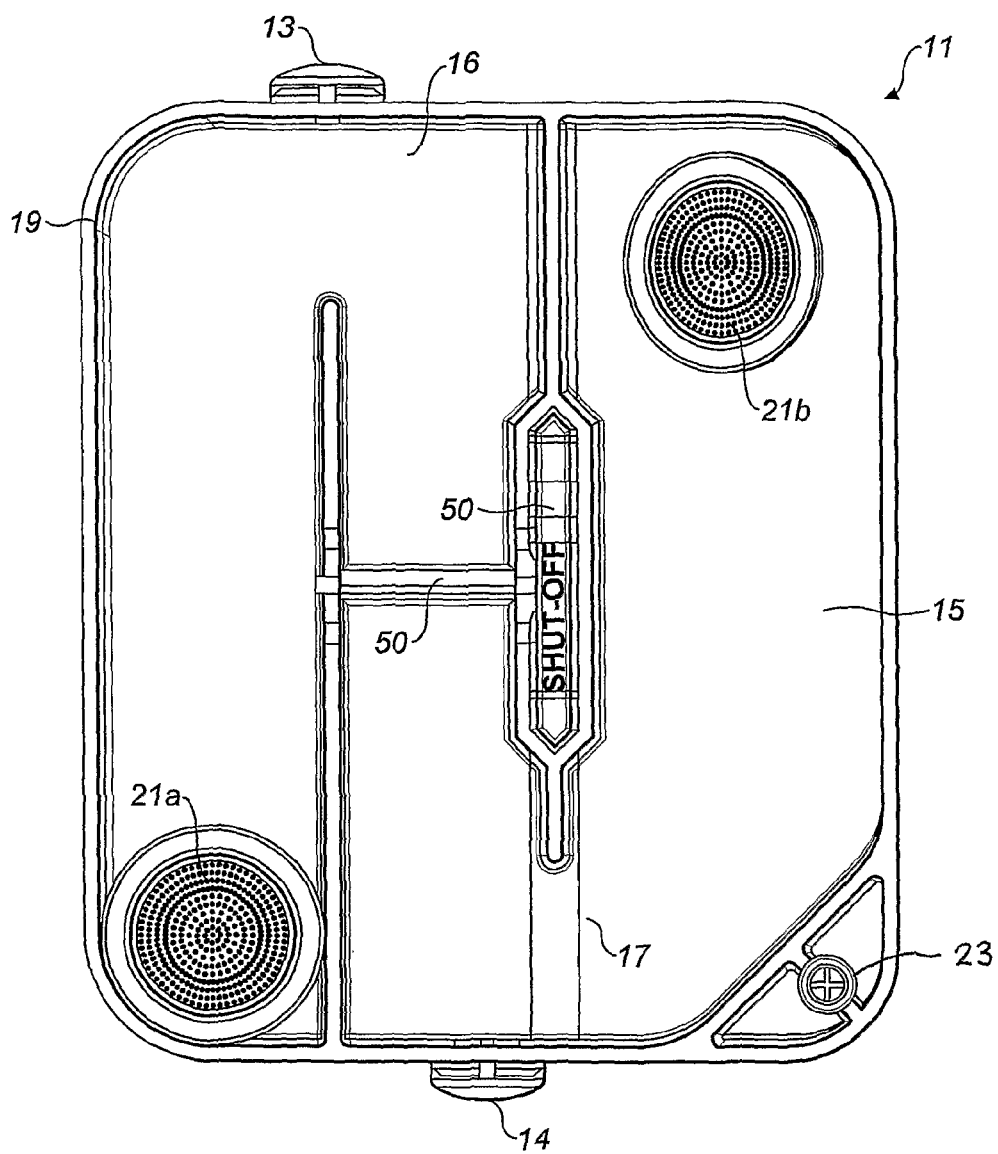
FIG. 2 is a front cross-sectional elevation of one embodiment of a valve of the present invention.
Figure 3:
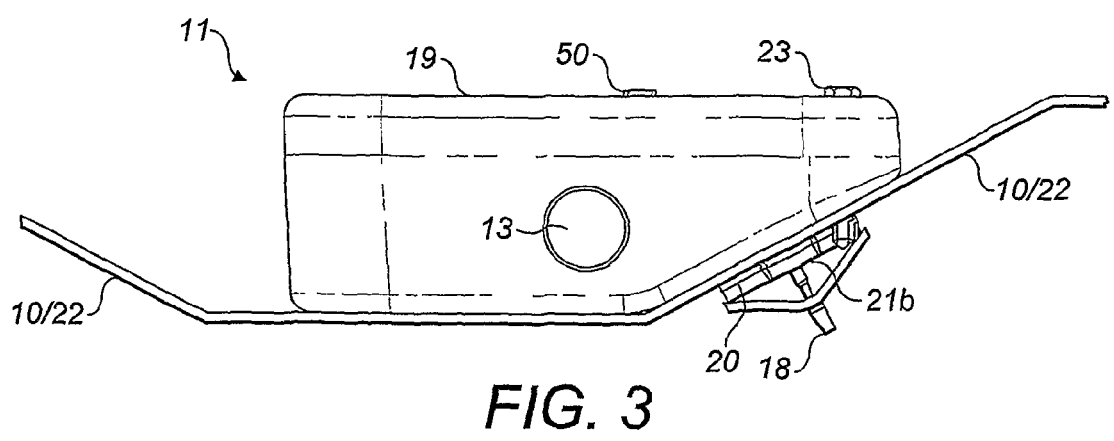
FIG. 3 is a plan elevation of the valve of FIG. 2 attached to a container.
Figure 5:
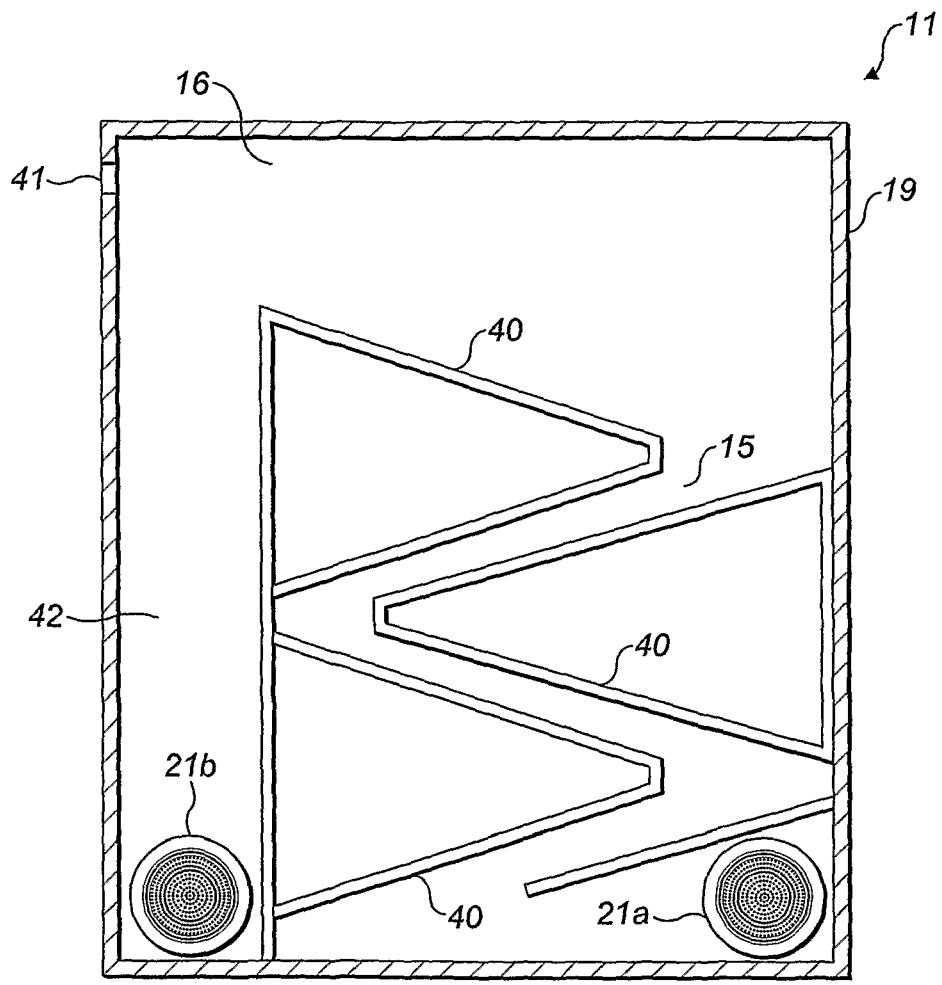
Figure 6:
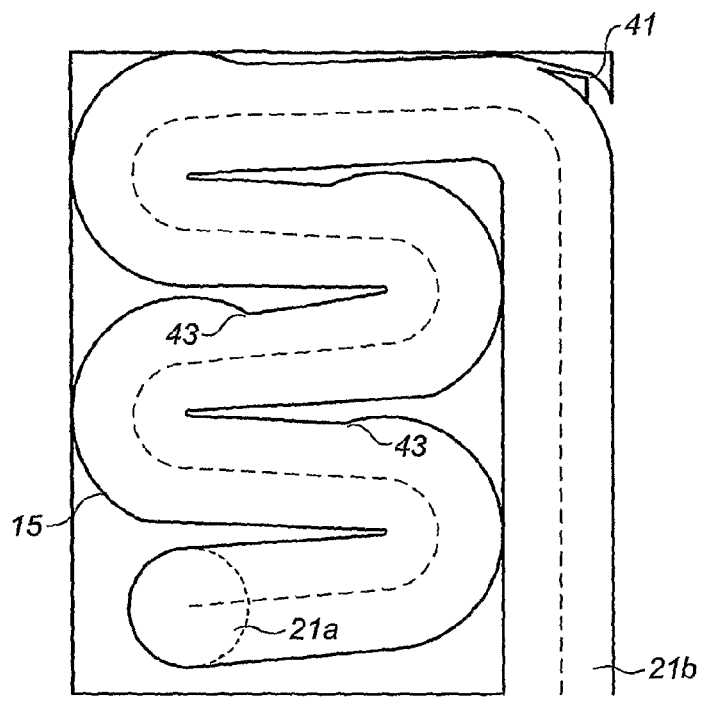
Figure 7:
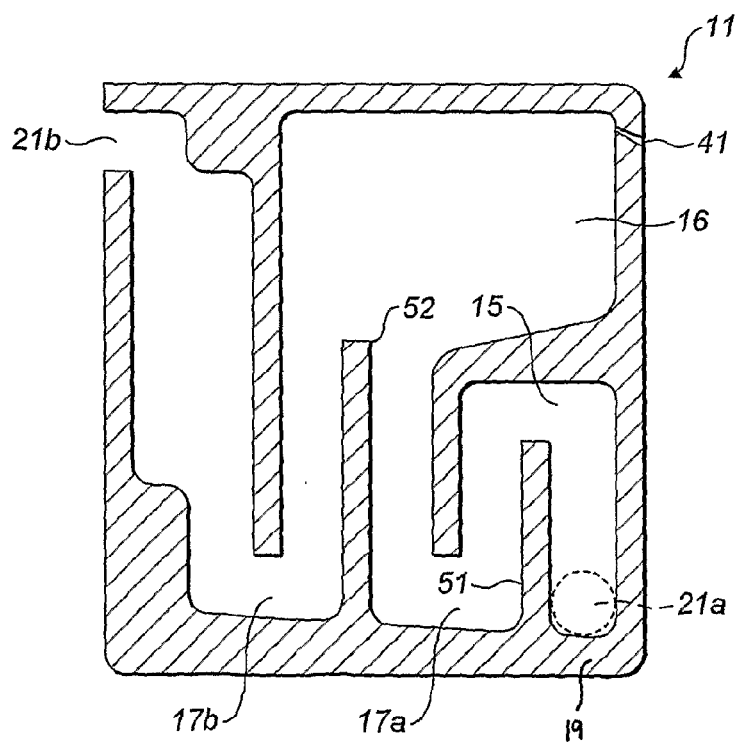
Figure 8:
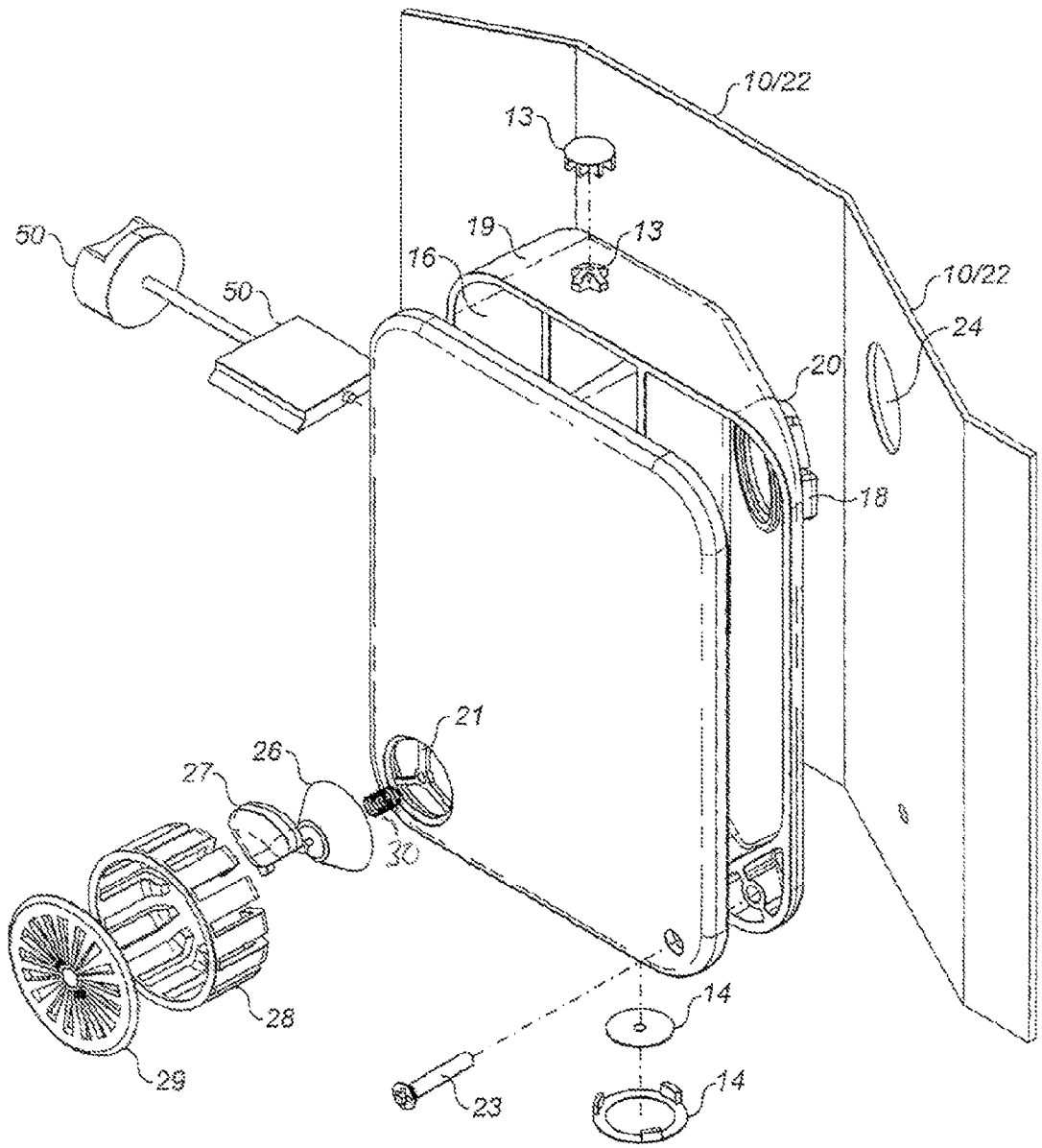
Figure 9:
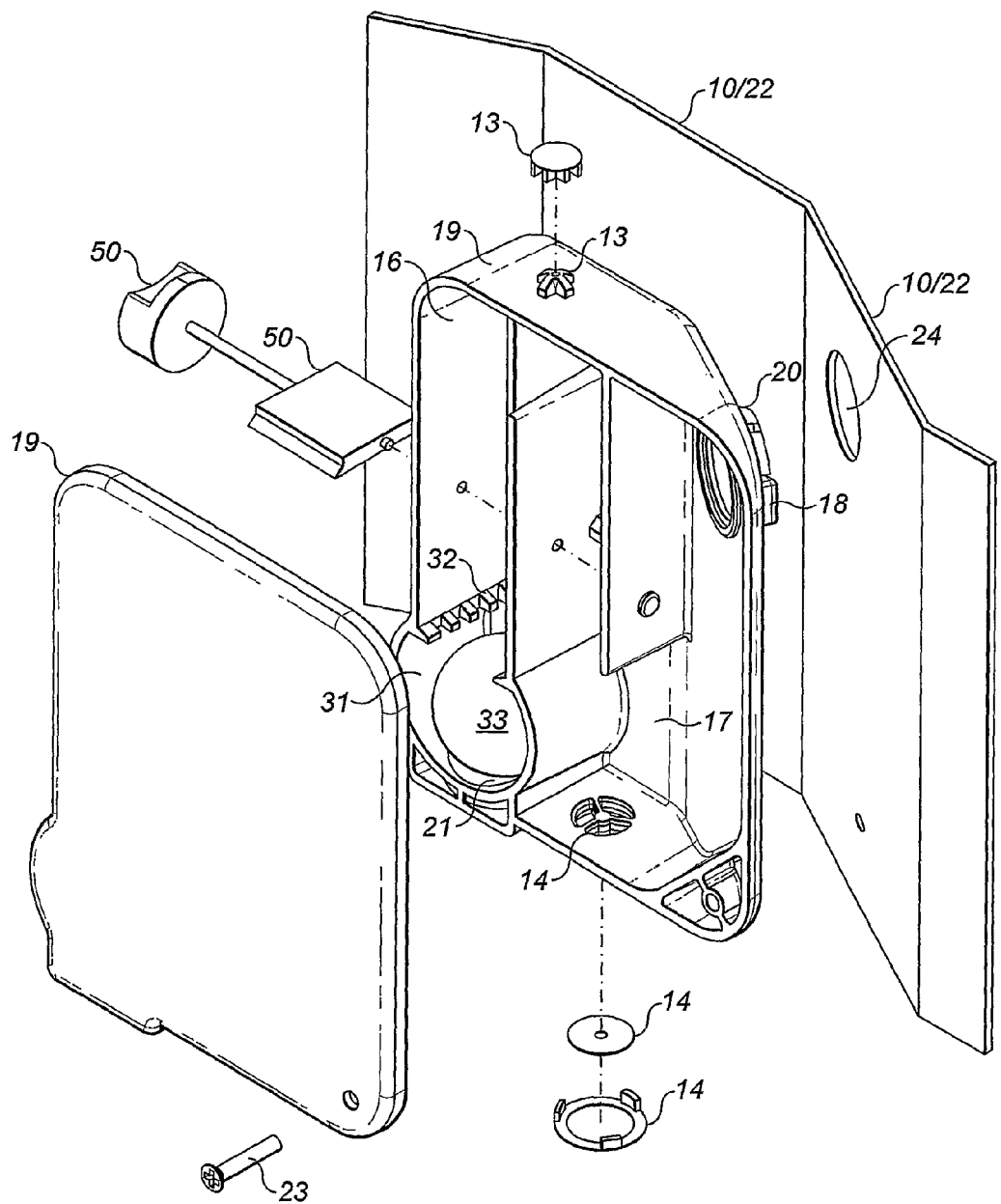

FIGS. 5, 6, and 7 are cross-sectional front elevations of two alternative embodiments of the valve of the present invention;

FIG. 8 is an exploded section of the valve of FIG. 2 mounted on a container including a secondary valve for restricting the inlet aperture of the valve; and FIG. 9 is an exploded section of the valve of FIG. 2 mounted on a container including an alternative secondary valve.

Figure 1:
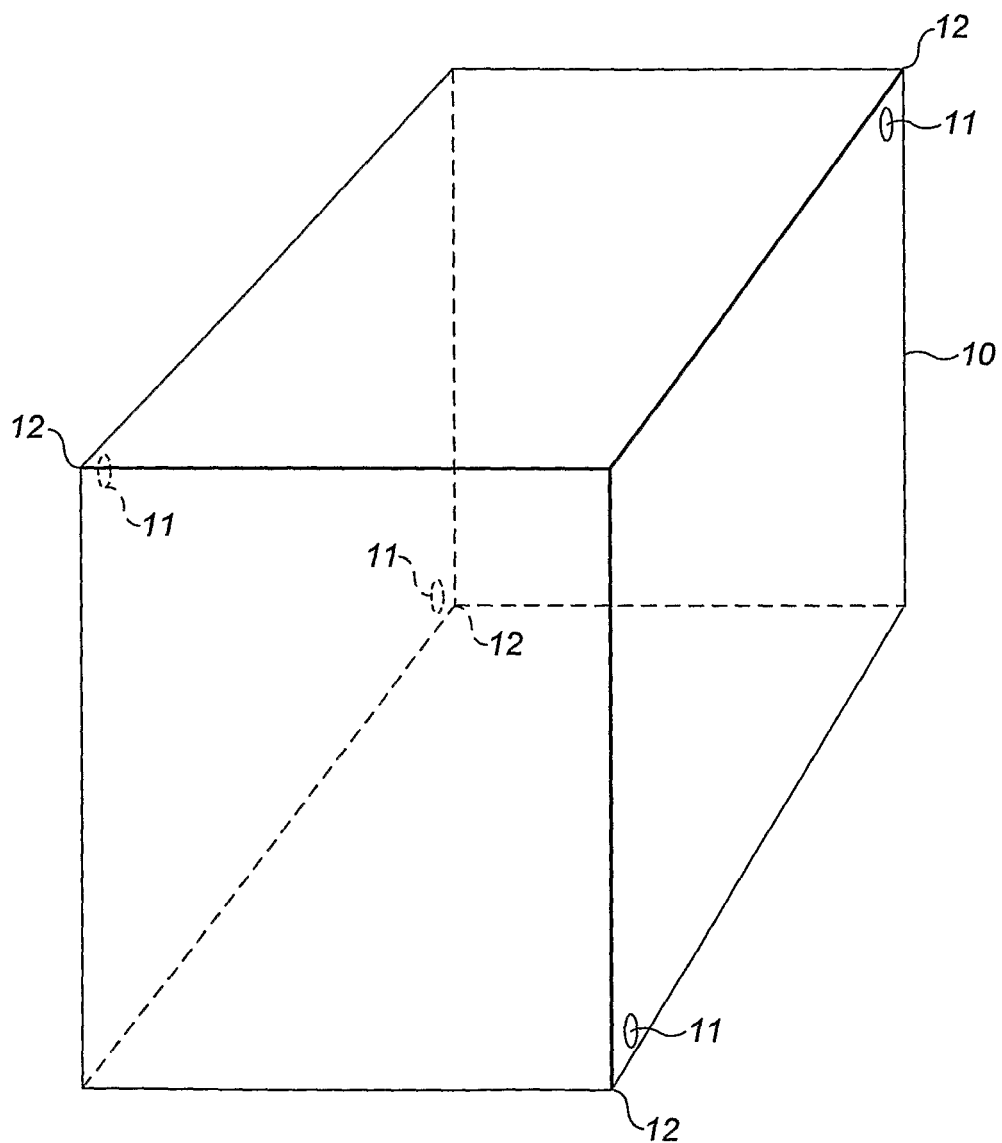
FIG. 1 is a schematic view of a shipping container fitted with valves to enable it to sink.

As shown in FIG. 1, a shipping container 10 is provided with a plurality of valves 11 according to the invention. The valves 11 are two way valves and allow water to flood into the container 10. When not in contact with water, or when underwater but located at the top of the container 10, the valves 11 allow air to escape from within the container 10 if under pressure. The valves 11 are preferably fabricated from plastic.

The valves 11 can be both internally and externally retrofitted to existing containers 10 and also designed into new ones.

Each container 10 preferably has a minimum of four valves 11 placed close to opposing corners 12 of the container 10 in such a way that, if a container 10 is floating, at least two valves 11 will be at the lowest point and submerged (allowing water to flow in), whilst the other two above are either also submerged or out of the water (for air to escape) whatever the orientation of the container 10. If a container 10 is able to sink when filled with water, the valves 11 will ensure that this happens swiftly. Containers 10 with built in vents (usually along the tops of the sides) will generally only need two valves 11 located at the bottom diagonally opposing corners.

The valves 11 preferably also incorporate a microchip 18 which is potentially also available for use by Customs and Excise or Port Authorities for identification and tracking of containers 10. The microchip 18, which is optionally built into the valve housing 19, can be used to identify an original valve 11 built under license. This necessitates a unique encoded number in each individual valve 11 located on the inside of the container 10. If the container 10 is sealed by a trusted agency, identification and processing by authorities electronically reading the number (from the outside of the container 10) could help in the targeting of resources in the detection of illicit imports/exports etc. Such a system could also use the GPS or GPRS or similar network to transmit more detailed information (eg Position, direction, weight)

In one embodiment of the invention the valve 11 comprises a housing 19 having an inlet aperture 21a and an outlet aperture 21b. Although the apertures 21a, 21b are designated "inlet" and "outlet" apertures, fluids (air or sea water in the intended use of the valve) can pass into and out of each of the apertures 21a, 21b. The apertures 21a, 21b may be covered by a gauze barrier or other suitable fluid permeable covering to prevent the ingress of insects or debris. Inside the housing 19 is a passageway 15 which extends indirectly between the apertures 21a, 21b. The passageway 15 provides an air-lock and preferably has a V- or U-bend section 17 (for convenience referred hereinafter to just as a U-bend). The sections making up the passageway 15 may be straight or curved, with angled or curved joints.

The passageway 15 may be defined by flanges formed on the inner walls of the housing 19 (preferably as mouldings) as shown in FIG. 2, or by separately formed piping or tubing alone or located within the housing 19. One end of the passageway 15 communicates with the inlet aperture 21a, and the other end (where the U bend 17 is formed) communicates with the outlet aperture 21b. On the outside of the housing 19 around the exit aperture 21b may be an annular flange 20 which, in use, extends through an aperture 24 in the wall of the container 10. The flange 20 is preferably provided with barbs or other means for locking the valve 11 in place on the container 10. Screw fixings 23 may also be used to firmly attach the valve 11 to the container 10.

In this embodiment of the invention, the valve 11 further includes one or more one way bleed valves that are positioned to allow a restricted flow of fluid out of the passageway 15. In the embodiment of the invention illustrated in FIGS. 1 to 4 a first bleed valve 13 allows air out of the air-lock via an upper section 16 of the passageway 15 above the inlet aperture 21a. A second bleed valve 14 is associated with the U-bend 17 and is located in the middle section of the U. Thus in the normal orientation of the valve 11 shown in the Figures, the bleed valve 13 is at the highest point of the valve 11 and the bleed valve 14 at the lowest point.

The size of the aperture of these bleed valves 13,14 dictates the rate at which the air-lock or U-bend 17 is evacuated, thus creating a time delay in the actuation of the valve 11. This is important as the valve 11 may be momentarily submerged by waves washing over it in high seas and this time delay function reduces the risk of accidental water ingress, effectively baffling the movement of water through it for a time and then resetting itself when the water subsides. Suitable bleed valves 13,14 have an aperture of a fraction of a millimeter. The air in the valve 11 would take a minute or so to escape through one of the bleed valves 13,14 with an aperture of this size. However, the aperture can be selected according to how quickly or slowly it is desired for the valve to open. The pressure outside the container 10 will also affect the bleed rate. As the container 10 sinks in the water, the air inside the valve 11 expands creating a greater pressure inside the valve 10. This increases the bleed rate.

When a valve 11 is submerged, water initially floods through inlet aperture 21a into the first section of the passageway 15, but is temporarily stopped at this point by the air pressure provided by the air-lock. If the incoming water pressure is maintained, the air in the air-lock slowly escapes through the bleed valve 13, eventually allowing the water to flow through the upper section 16 of the passageway 15 and continue into the down-section of the U-bend 17. The water continues to flow round the bend, into the up-section of the U-bend 17 and through the outlet aperture 21b into the container 10. The water must be under some pressure to make this journey as it has to pass through two upward sections in the passageway 15. Therefore rain and splashes will not be sufficient for the water to enter the container 10. Temporary submersion may create a circumstance where water begins its journey through the valve 11, but the time delay caused by the air lock slows it down so that when the valve 11 is clear of the water again the inlet aperture 21a or bleed valve 14 evacuates any water in the system.

Additionally, the valve(s) 11 on any opposing corners to the submerged valve(s) 11 which are out of the water allow trapped air to escape the container through either bleed valves 13 or 14 or through aperture 21a.

The valves 11 thus give protection to any cargo within the container 10 from ingress of water in bad weather by means of the time delay created by interaction of the air-lock and bleed valves 13,14.

It should be noted that in this embodiment of the invention, when inverted from the orientation shown in FIGS. 1 to 4, the passageway 15 still has an N-shaped configuration which means that the valve 11 can operate in reverse. This means that the outlet valve 21b becomes an inlet valve which lets fluid flow into the valve 11 from the container 10 and the inlet valve 21a becomes an outlet valve which lets fluid flow out of the valve 11 to the surroundings. Similarly what was originally the up-section of the U-bend 17 becomes the airlock section, and the original airlock section 16 becomes the up-section of the U-bend section. Thus the valves 11 will continue to operate when they are inverted but in reverse.

The housing 19 is preferably designed in such a way as to fit within the crenulations 22 of the design of a standard shipping container 10 and is thus partially protected by the container 10 itself from glancing blows. However it can also be easily modified to fit within the insulated wall of a refrigerated or "reefer" style of container 10.

An alternative embodiment of the valve 11 of the present invention is shown in FIG. 5. In this embodiment the bleed valve is replaced by a tiny aperture 41 and the passageway 15 is provided by a series of flanges 40 to provide an indirect meandering, preferably zig-zag route through the valve 11. It is preferred that a number of "bends" or changes of direction occur in the section of passageway 15 between the inlet aperture 21a and the upper section 16. The indirect nature of the passageway 15 provides a much greater volume of air in the air lock. Instead of flanges 40, the passageway 15 may be defined by tubing or other means which have a serpentine-like portion as shown in FIG. 6. The passageway 15 has a straight section 42 which extends straight from the upper section 16 down to the outlet aperture 21b.

Despite the absence of the bleed valve 13, the valve 11 still provides a time delay action which delays the flow of liquid through the passageway 15, by controlling the release of the air pocket within the passageway 15. Water entering through the inlet aperture 21a is immediately impeded by the air in the passageway ahead of it extending up to the upper section 16 in which a tiny aperture 41 is located. Air is slowly released through the aperture 41. Using aperture sizes of fractions of millimeters, this can create a time delay of numbers of minutes. When enough air has escaped to allow the water to rise to upper section 16, the water can then begin to flow down the straight section 42 and out through the outlet aperture 21b. As long as the external water level is higher than the top of the valve 11, water will flow swiftly through the passageway 15, with full flow being achieved once all of the air has escaped through the aperture 41.

The shape of the bends in the passageway 15 can provide eddy points 43 (see FIG. 6) which baffle blasts of air carrying water droplets (e.g. for driving rain). These eddy points 43 baffle and slow down air flow so that water droplets fall from the air and drop down through the passage way 15, draining back through the inlet aperture 21a.

If the container 10 inverts, so that the valve 11 is top most, it simply allows air to flow unimpeded through the passageway 15 to equalise the pressure, whilst the container is flooded through the valves 11 or vents then located at the bottom of the container 10.

A further alternative embodiment of the valve 11 of the present invention is illustrated in FIG. 7. In this embodiment the passageway 15 has two U-bend sections 17a, 17b and a single venting aperture 41.

When the container 10 is submerged, water enters the valve 11 through an inlet aperture 21a in the valve housing 19 into the first section of the passageway 15. It passes up over the first dividing wall 51 into the first U-bend 17a. As the water continues to flood into the valve 11, it rises up over the second dividing wall 52 into the second U-bend 17b, thus creating an air lock in the upper section 16 of the passageway. Air gradually escapes through the venting aperture 41 until the water level rises sufficiently to flow out of the outlet aperture 21b.

The upper section 16 of the passageway 15 may be formed as a chamber and the sizes of the chamber and venting aperture 41 determine the time delay in the valve 11. If the valve 11 is submerged for a period of time, water will flow through the valve 11 after the air lock has dissipated. However, if the valve 11 is subsequently de-submerged water can recede back out of the valve 11 through the water inlet 21a. Optionally, the addition of apertures or one way valves allowing water to flow out of the valve 11 maybe provided, for example at the base of the dividing walls 51,52. Such valves would need to be small to prevent them undermining the overall operation and effectiveness of the valve 11.

Multiple U-bends and chambers may also be used to enhance the operation of the valve 11.

Airborne water, such as driven sea spray, entering valve 11 through the inlet aperture 21a will be sufficiently baffled by the dividing walls 51,52 so that it will not make it through the valve 11 into the container 10. Water entering the valve 11 from such spray will gather at the bottom of the U-bends 17a, 17b eventually creating the air lock and thus hindering any further spray from entering the valve 11 at all.

A disabling device in the form of a stop valve 50 is preferably fitted to the valve 11, which can be manually set to close off the valve 11 entirely. This is of interest because, not only can the depth of bilge in ship's holds effectively submerge the valves 11, but also deck sidings on some container ships can stop water from freely draining. In this case the bottom containers 10 in the stack (the least likely to fall) can regularly be submerged in 0.5 to 1 meter of water, particularly in high seas. Alternatively a simple bung can be placed in the inlet aperture 21a.

Figure 4:
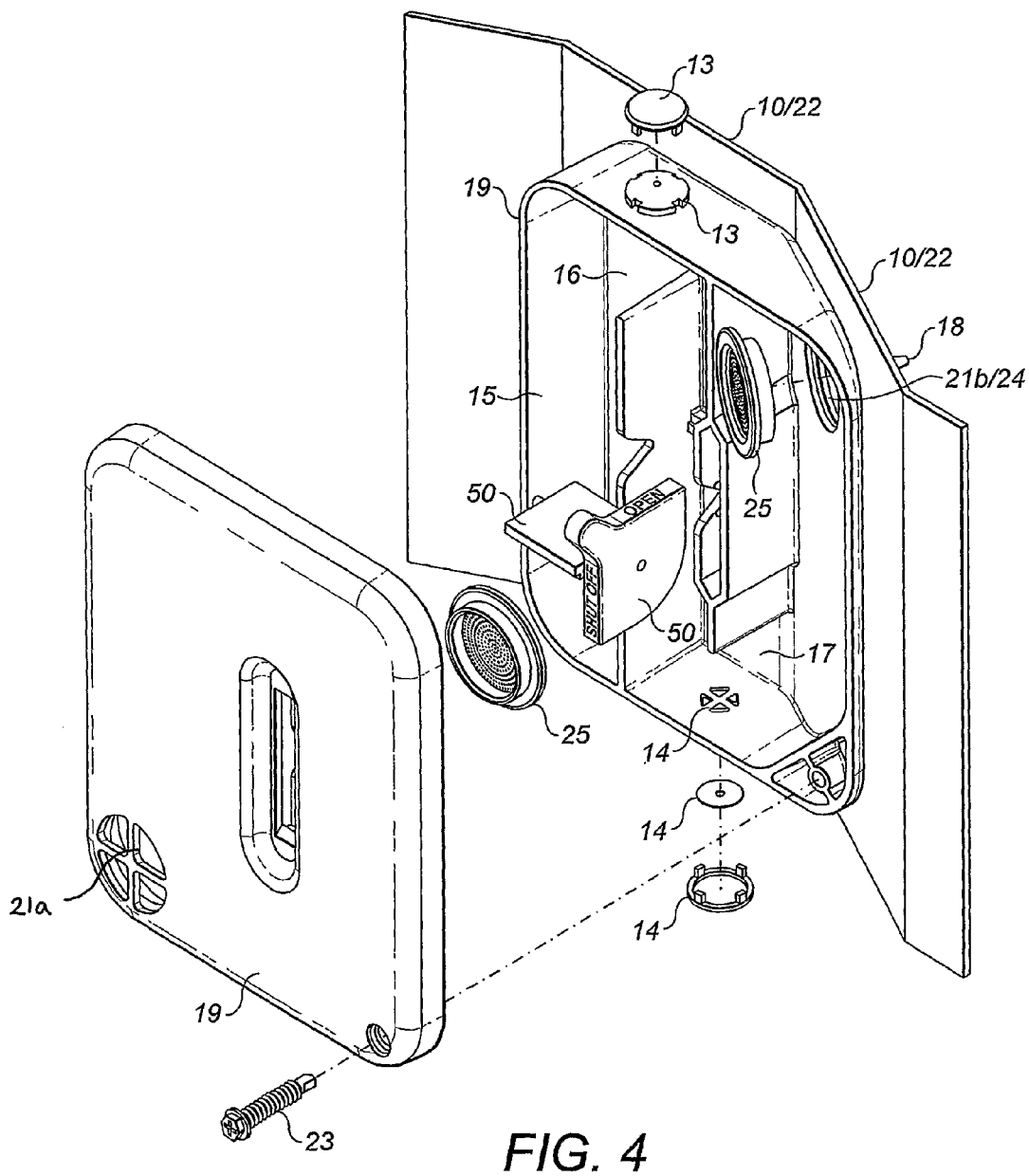
FIG. 4 is an exploded section of the valve of FIG. 2 mounted on a container.

Passageway of water, particulates and even animal life through the valve 11 can be restricted or stopped in a number of ways. FIG. 4 shows a simple mesh cover 25 providing a simple form of protection from intrusion. Two more complex arrangements are described below.

The invention also relates to an alternative configuration of valve which can replace the mesh cover 25 described above and be attached directly to the aperture 24 in the wall of the container 10 or can be used as a secondary valve in addition to the valve as described above.

FIG. 8 shows such a valve being used as a secondary valve attached to the inlet aperture 21a. The valve arrangement is advantageous in that it will operate at any attitude. The valve initially seals off aperture 21a/container opening 24, preventing ingress of particulates and animals. The valve is a ballcock type of valve comprising a conical stopper 26 which is normally held in place sealing off inlet aperture 21a/container opening 24 by a spring 30. The valve further comprises a float 27, which is either annular or a section of an annulus, and able to spin on its fixing to the cone stopper 26. When submerged the float 27 rises acting against the spring 30 and pulling the cone stopper 26 free of inlet aperture 21a/container opening 24. This allows water to flow into the inlet aperture 21a/container opening 24. The operational components 26, 27, 30 of the ball-cock assembly are contained within a protective case 28 and cap 29 which have slots to allow the ingress of water.

FIG. 9 shows yet another aspect of the present invention. The valve again can replace the valve 11 or be used as a secondary valve in addition to the valve 11 as described above. This valve is a ball valve which comprises a heavy, but buoyant, ball 33 contained within a chamber 31. The ball 33 is normally seated over, thus sealing off, aperture 21a/container opening 24. When submerged in water, the ball 33 floats upwardly in the chamber 31 until stopped by a row of teeth 32 located at the top of the chamber 31, thus allowing water to flow around it and enter the inlet aperture 21a/container opening 24.

This type of valve will work at any attitude, other than fully inverted, in which case either (when out of the water) the ball 33 drops toward the teeth 32, thereby opening valve 11, or the ball 33 tries to float but is pushed aside by the pressure of water trying to enter the inlet aperture 21a/container opening 24 thus equalising the pressure differential between outside and inside container 10.

The invention claimed is:

1. A valve, said valve comprising:
   a housing having first and second apertures for the ingress and egress of fluid into/from a passageway located within the housing, said passageways extending indirectly from the first to the second aperture and comprising means for creating an air-lock;
   the valve further comprising at least one bleed means for allowing fluid to bleed out of the passageway at a rate slower than fluid is able to enter one of the apertures; and
   wherein a liquid entering the first aperture is prohibited from passing along the passageway to the second aperture until substantially all air within the valve has bled out of the bleed means; and a liquid entering the second aperture is prohibited from passing along the passageway to the first aperture until substantially all air within the valve has bled out of the bleed means.

2. The valve as claimed in claim 1 in which the passageway is defined by flanges formed on an inner wall of the housing.

3. The valve as claimed in claim 1 in which the passageway is defined by tubing along or located within the housing.

4. The valve as claimed in claim 1 in which the passageway further incorporates at least one U-bend section.

5. The valve as claimed in claim 4 in which the passageway incorporates a plurality of U-bend sections.

6. The valve as claimed in claim 1 in which the passageway is substantially N shaped.

7. The valve as claimed in claim 1 in which one of the first and second apertures is located at a higher point to the other aperture.

8. The valve as claimed in claim 1 in which the at least one bleed means is a one-way bleed valve.

9. The valve as claimed in claim 1 in which the at least one bleed means comprise at least two one-way bleed valves, one in an upper section of the passageway and one in a lower section of the passageway.

10. The valve as claimed in claim 1 in which the passageway comprises at least one chamber in a locality of the bleed means.

11. The valve as claimed in claim 1 in which an annular flange is located on an external wall of the housing around one of the first and second apertures.

12. The valve as claimed in claim 11 in which the annular flange is provided with means for securing the valve, in use, to an aperture in a wall of a container.

13. The valve as claimed in claim 1 further comprising a microchip.

14. The valve as claimed in claim 1 further comprising a disabling device activatable to close off the valve.

15. The valve as claimed in claim 1 further comprising a fluid permeable barrier or filter covering an inlet aperture.

16. The valve as claimed in claim 1 further comprising secondary valve means for restricting the flow of water into one of the first and second apertures.

17. The valve as claimed in claim 16 in which the secondary valve means comprises a spring biased stopper normally biased into a sealing position with an inlet aperture and a buoyant actuator attached to the stopper, such that when the valve is submerged the actuator rises moving the stopper out of sealing contact with one of the first and second apertures.

18. The valve as claimed in claim 16 in which the secondary valve means comprises a chamber within which is a buoyant ball normally seated in sealing contact with at least one of the first and second apertures, wherein when the valve is submerged the ball floats within the chamber out of sealing contact with one of the first and second apertures.

19. The valve, according to claim 1 further including a spring biased stopper normally biased into a sealing position and a buoyant actuator attached to the stopper, such that when the valve is submerged the actuator rises moving the stopper out of the sealing position.

20. The valve as claimed in claim 19 in which the stopper and actuator are contained in a housing having openings which allow the ingress of water.

21. The valve according to claim 1 further including a chamber within which is a buoyant ball normally seated in a sealing position with an aperture, wherein when the valve is submerged the ball floats within the chamber out of the sealing position.

22. A container comprising a plurality of walls and at least one valve as claimed in claim 1.

23. The container as claimed in claim 22 in which the container has six walls and eight corners and at least four valves located at at least four opposing corners.

* * * * *